(12) United States Patent
Stearns

(10) Patent No.: US 8,168,298 B2
(45) Date of Patent: May 1, 2012

(54) ARTICLE AND METHOD OF PRODUCING SAME

(75) Inventor: Robert B. Stearns, Dearborn, MI (US)

(73) Assignee: BASF Corporation, Florham Park, NJ (US)

( * ) Notice: Subject to any disclaimer, the term of this patent is extended or adjusted under 35 U.S.C. 154(b) by 1173 days.

(21) Appl. No.: 11/937,521

(22) Filed: Nov. 9, 2007

(65) Prior Publication Data

US 2008/0143083 A1    Jun. 19, 2008

Related U.S. Application Data

(60) Provisional application No. 60/868,136, filed on Dec. 1, 2006.

(51) Int. Cl.
*B32B 27/40* (2006.01)
*B60R 21/16* (2006.01)
*B29C 44/04* (2006.01)

(52) U.S. Cl. ............ 428/423.1; 428/423.3; 280/728.1; 280/729; 264/45.1

(58) Field of Classification Search ............ 428/423.3, 428/423.1; 280/728.1, 729; 264/45.1
See application file for complete search history.

(56) References Cited

U.S. PATENT DOCUMENTS

| | | |
|---|---|---|
| 5,072,967 A | 12/1991 | Batchelder et al. |
| 5,082,310 A | 1/1992 | Bauer |
| 5,158,322 A * | 10/1992 | Sun ............................ 280/732 |
| 5,179,132 A * | 1/1993 | Mizuno et al. ................ 521/174 |
| 5,590,901 A | 1/1997 | MacGregor |
| 5,635,261 A | 6/1997 | Georgelos et al. |
| 5,744,776 A | 4/1998 | Bauer |
| 6,267,918 B1 | 7/2001 | Bauer |
| 6,294,124 B1 | 9/2001 | Bauer et al. |
| 6,352,658 B1 * | 3/2002 | Chang et al. .................. 264/46.4 |
| 6,432,543 B2 * | 8/2002 | Harrison et al. ............ 428/423.1 |
| 6,479,114 B2 * | 11/2002 | Mizuno et al. ............... 428/35.7 |
| 6,518,330 B2 | 2/2003 | White et al. |
| 6,632,652 B1 | 10/2003 | Austin et al. |
| 6,746,522 B2 | 6/2004 | Trippe et al. |
| 6,787,221 B2 * | 9/2004 | Botrie et al. ............... 428/304.4 |
| 6,808,197 B2 | 10/2004 | Bauer et al. |
| 6,858,659 B2 | 2/2005 | White et al. |
| 6,945,559 B2 | 9/2005 | Kassman et al. |
| 7,029,044 B2 | 4/2006 | Browne et al. |
| 7,160,977 B2 | 1/2007 | Hale et al. |
| 7,276,191 B2 | 10/2007 | Park |
| 2005/0137356 A1 | 6/2005 | Hale et al. |
| 2005/0184619 A1 | 8/2005 | Chen |
| 2005/0250878 A1 | 11/2005 | Moore et al. |
| 2007/0148411 A1 * | 6/2007 | Yamada ........................ 428/172 |

* cited by examiner

*Primary Examiner* — Thao T. Tran
(74) *Attorney, Agent, or Firm* — Howard & Howard Attorneys PLLC

(57) ABSTRACT

An article is formed in a mold having a mold cavity, has a periphery, and defines a score line having a tensile heal strength of less than 200 ppi along the score line. The article includes a cured urethane composition including the reaction product of an isocyanate component and a resin composition. The cured urethane composition is used in a method of forming the article. The method includes the steps of determining a theoretical tensile heal strength along the score line and applying the isocyanate component into the mold cavity in response to the determining of the theoretical tensile heal strength. The method also includes the steps of applying the resin composition into the mold cavity, reacting the isocyanate component and the resin composition to form a urethane composition, curing the urethane composition, and de-molding the article from the mold cavity.

20 Claims, 4 Drawing Sheets

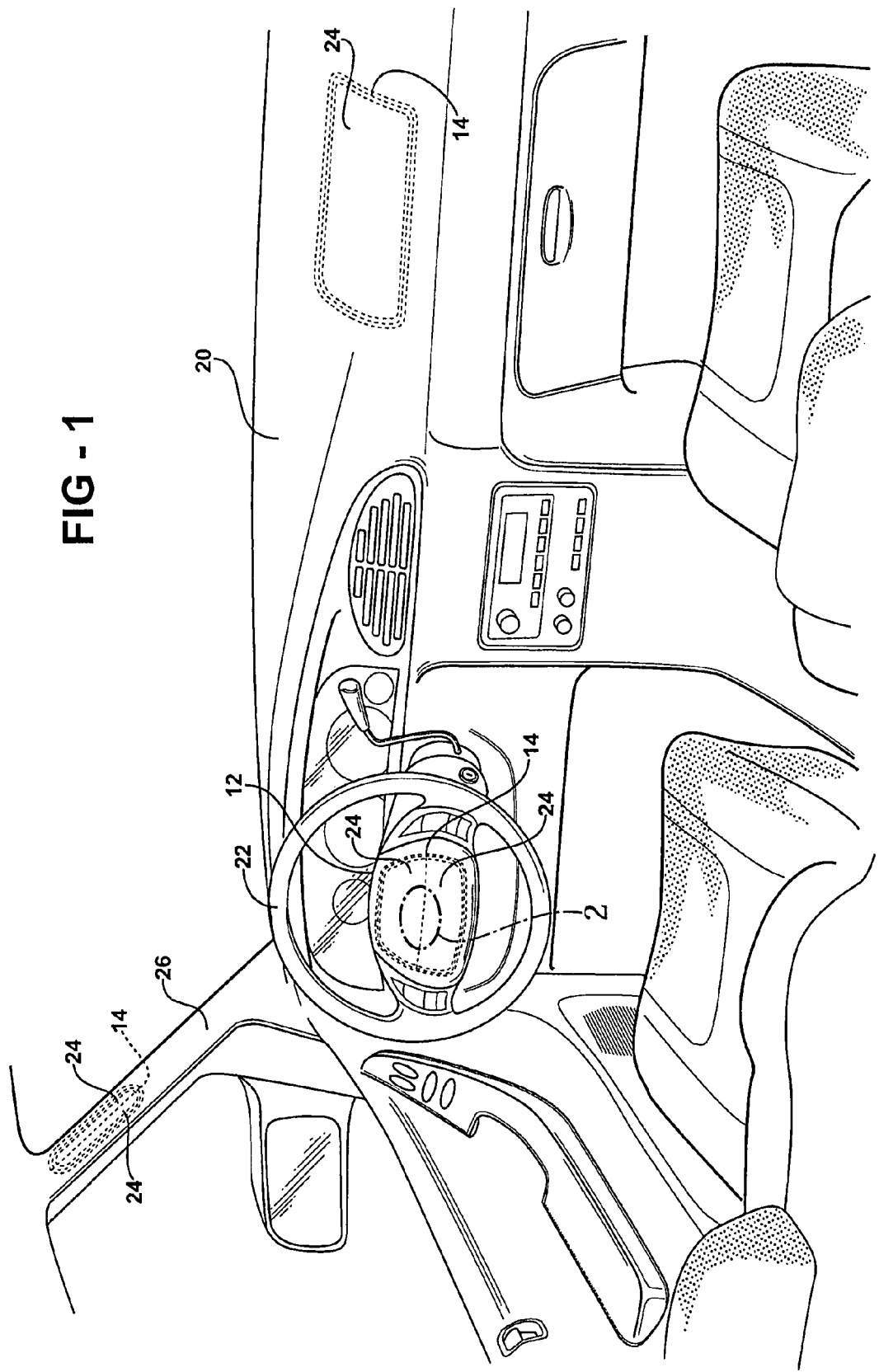

ARTICLE AND METHOD OF PRODUCING SAME

RELATED APPLICATIONS

This application claims priority to U.S. Ser. No. 60/868,136, filed on Dec. 1, 2006.

FIELD OF THE INVENTION

The present invention generally relates to an article and a method of forming the article. The article has a periphery, defines a score line within the periphery, and has a particular tensile heal strength along the score line.

DESCRIPTION OF THE RELATED ART

Articles formed from urethane compositions are commonly used by automobile manufacturers in a wide variety of applications. The urethane compositions, once cured, are typically elastomeric and are used in formation of air-bag covers. These covers typically include score lines which divide the covers into two portions (e.g., doors) that are separable from one another under pressure.

Articles that are formed from cured urethane compositions and that include score lines, such as air-bag covers, exhibit a tendency to self-heal, i.e., the score line tends to seal and repair itself. Through self-healing, the article is at least partially reconstituted and the score line is partially repaired. If this occurs in an air-bag cover, then an increased pressure is needed to separate the two portions of the air-bag cover from one another. Relative to air-bag deployment, separation of the two portions is critical in determining whether an air-bag can be effectively deployed.

Air-bags are typically deployed via ignition of a solid propellant in an inflation system. This ignition creates a large volume of gas which inflates the air-bag and causes the air-bag to burst through the two portions of the air-bag cover into the cabin of the automobile. The air-bag commonly bursts through the two portions of the air-bag cover at speeds of up to 250 mph and with pressures of up to 1,000 Newtons. These speeds and pressures are needed for effective air-bag deployment. As such, the ability of the two portions to separate from one another under pressure is of critical importance to effective air-bag deployment.

To ensure quality and reliability of the air-bag deployment, many of the automobile manufacturers require testing of the two portions to determine a degree of self-healing of the two portions. The degree of self-healing is measured as an amount of force needed to separate the two portions. This force is reported as a tensile heal strength along the score line. Currently, many of these automobile manufacturers utilize air-bag covers that have tensile heal strengths of greater than 275 pounds per inch along the score lines. Although these current air-bag covers allow for safe and effective air-bag deployment, tensile heal strengths of greater than 275 pounds per inch require the air-bags to deploy at high pressures leading to increased usage of the solid propellants. If tensile heal strengths were minimized, decreased pressures would be required for effective air-bag deployment and decreased amounts of the solid propellant would be needed.

In the aforementioned applications of using the cured urethane composition in the air-bag covers, increased self-healing and increased tensile heal strengths lead to increased usage of materials and therefore are preferably minimized. However, in some applications, increased self-healing and increased tensile heal strengths are desired and can be balanced, such as in the formation of both automotive and non-automotive seats. The seats, unlike the air-bag covers, are usually not intentionally scored so as to maintain integrity of the cured urethane compositions in the seats. However, the seats can crack which essentially forms similar portions as those formed in the air-bag covers. When the seats crack, it is desirable that the portions exhibit a high degree of self-healing and an increased tensile heal strength to restore integrity of the seats along the cracks and allow the seats to at least partially self-repair.

Accordingly, there remains an opportunity to form an article defining a score line and having a particular tensile healing strength along the score line. There also remains opportunities to provide a method of forming the article.

SUMMARY OF THE INVENTION AND ADVANTAGES

The present invention provides a molded article having a periphery and defining a score line within the periphery. The score line divides the molded article into at least a first portion and a second portion which is separable from the first portion upon application of pressure. The molded article has a tensile heal strength of less than 200 pounds per inch along the score line. Further, the molded article includes a cured urethane composition including the reaction product of an isocyanate component and a resin composition including a polyol.

The present invention also provides a method of forming the molded article. In a first embodiment, the method includes the step of determining a theoretical tensile heal strength along the score line and the step of applying the isocyanate component into a mold cavity in response to the determining of the theoretical tensile heal strength. This first embodiment also includes the step of applying the resin composition including the polyol into the mold cavity, the step of reacting the isocyanate component and the resin composition for form a urethane composition, the step of curing the urethane composition, and the step of de-molding the molded article from the mold cavity.

In a second embodiment, the method includes the step of applying the isocyanate component and the resin composition including the polyol into the mold cavity, and the step of reacting the isocyanate component and the resin composition to form the urethane composition. This second embodiment also includes the step of curing the urethane composition, the step of de-molding the molded article from the mold cavity, and the step of scoring the molded article within the periphery to form the score line having the tensile heal strength of less than 200 pounds per inch along the score line.

The molded article and method can be effectively utilized in both automotive and non-automotive applications. If used in automotive applications as air-bag covers, the molded article allows automobile manufacturers to use less material (e.g., solid propellant) to inflate the air-bag, thereby reducing production costs. Also, the molded article allows for greater ease in air-bag deployment as the first and second portions of the molded article separate with less than 200 pounds per inch along the score line. This method can also be effectively used in both automotive and non-automotive applications.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein:

FIG. 1 is an environmental view of a steering wheel, instrument panel, and A-pillar of a vehicle including air-bag doors as molded articles of the present invention;

DETAILED DESCRIPTION OF THE INVENTION

The present invention provides a molded article (10), as generally shown in FIGS. 1 through 3B. In the molded article (10), an amount and strength of self-healing is preferably minimized. As is known in the art, and as applied to the instant invention, self-healing of the molded article (10) is the closing of cracks and/or score lines (14) in the molded article (10) thereby increasing a force required to re-fracture the molded article (10) and re-form the cracks and/or score lines (14). Without intending to be bound by any particular theory, it is believed that the self-healing of the molded article (10) of the instant invention is the result of molecular entanglements and secondary bonding between molecules that make up the molded article (10). These molecular entanglements and the secondary bonding will be described in greater detail below.

Referring now to FIG. 1, the molded article (10) is preferably an air-bag cover. In a first embodiment, the molded article (10) is a driver's (front) air-bag cover disposed within a steering wheel (22). In a second embodiment, the molded article (10) is a passenger's (front) air-bag cover disposed within an instrument panel (20). In a third embodiment, the molded article (10) is a side air-bag cover that may be used in the front, side, and/or rear of an automobile such as in A (26), B, C, and/or D pillars of the automobile. Alternatively, the air-bag cover may be disposed in a headliner (not shown) of the automobile. Although the molded article (10) is preferably an air-bag cover, the molded article (10) is not restricted to this application and may be used in a variety of industries including both automotive and non-automotive industries. It is contemplated that the molded article (10) may be utilized in fanning or sporting applications in seats, panels, doors, and the like.

The molded article (10) has a periphery (12). The periphery (12) may be symmetric or asymmetric and may include any shape. In one embodiment, the periphery (12) defines a rectangle. In another embodiment, the periphery (12) defines a square. The periphery (12) may also define shapes having filleted corners.

The molded article (10) also defines a score line (14) within the periphery (12). In one embodiment, the molded article (10) defines multiple score lines (14) within the periphery (12). For purposes of the instant invention, the terminology "within" the periphery (12) references the score line (14) defined at or within the periphery (12). In one embodiment, the score line (14) is defined at the periphery (12), i.e., the score line (14) forms the periphery (12). In another embodiment, as shown in FIGS. 1 through 3B, the score line (14) is defined within the periphery (12).

Figure 2A:
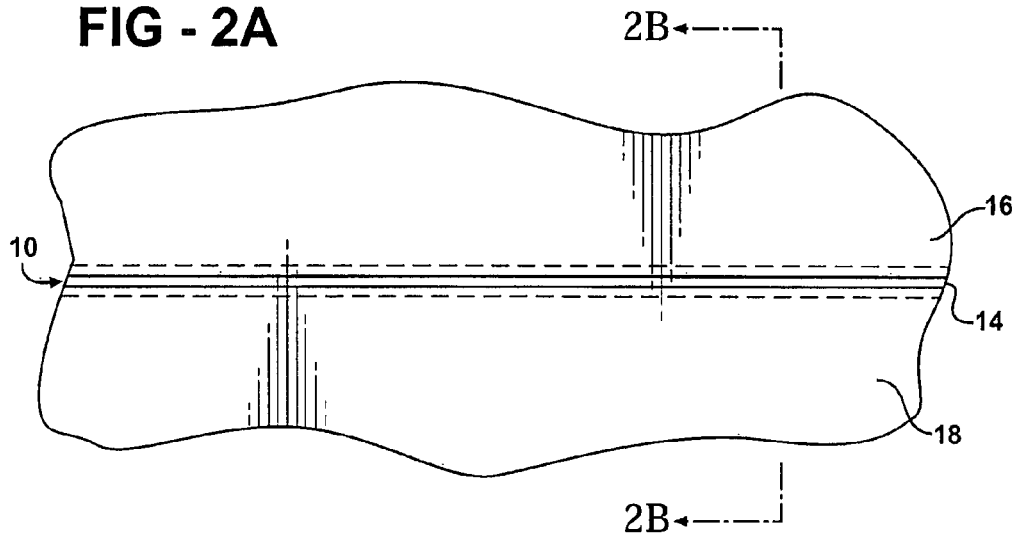
FIG. 2A is a top view of a molded article having a periphery, defining a score line within the periphery, and having a tensile heal strength of less than 200 pounds per inch along the score line.
Figure 2B:
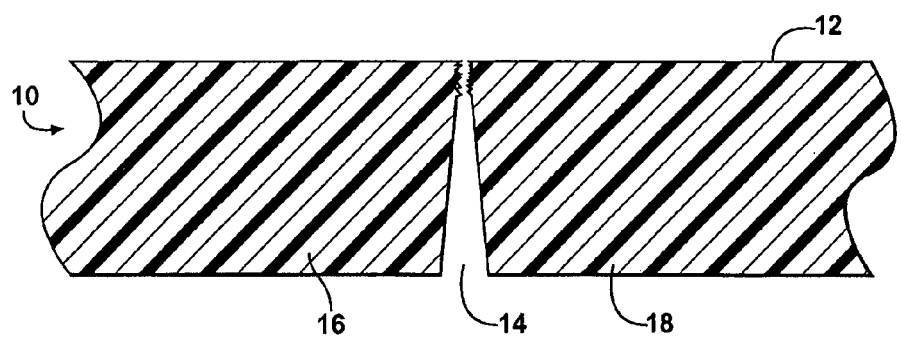
FIG. 2B is a cross-sectional view of the molded article of FIG. 2A including the score line extending completely through the molded article dividing the molded article into a first portion and a second portion.
Figure 2C:
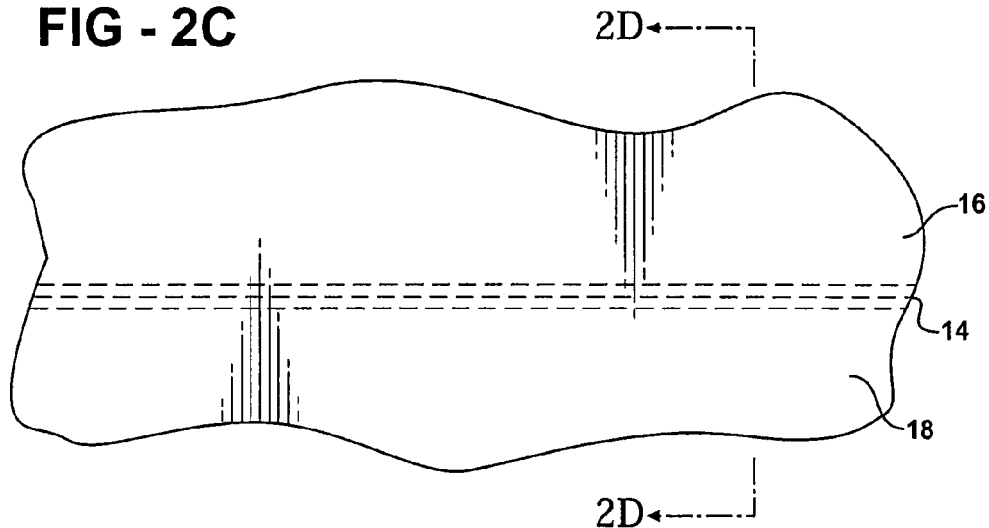
FIG. 2C is a top view of a molded article having a periphery, defining a score line within the periphery, and having a tensile heal strength of less than 200 pounds per inch along the score line.
Figure 2D:
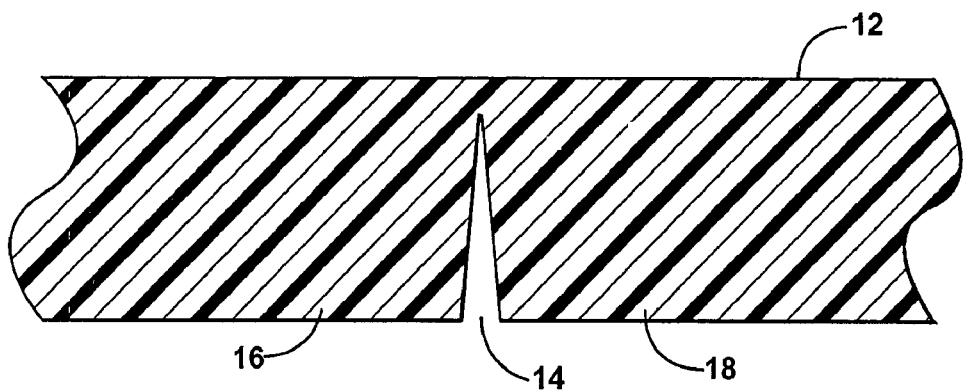
FIG. 2D is a cross-sectional view of the molded article of FIG. 2C including the score line extending partially through the molded article dividing the molded article into the first portion and the second portion.

The score line (14) preferably divides the molded article (10) into a first portion (16) and a second portion (18). The second portion (18) may be separable from the first portion (16) upon application of pressure. If the molded article (10) is an air-bag cover, the first and second portions (16, 18) may be air-bag doors (24), as shown in FIG. 1. Alternatively, the first portion (16) may include the air-bag door (24) and the second portion (18) may include an instrument panel (20) or another portion of the automobile such as the A pillar (26), as also shown in FIG. 1. It is also contemplated that the score line (14) may divide the molded article (10) into additional portions other than the first and second portions (16,18). In all embodiments, the score line (14) may be of any shape. Preferably, the score line (14) is perpendicular relative to at least a portion of the periphery (12). However, the score line (14) may be curved or angled relative to the periphery (12). The score line (14) may also be of any depth. In one embodiment, the score line (14) extends completely through the molded article (10), as shown in FIGS. 2A and 2B. In another embodiment, as shown in FIGS. 2C and 2D, the score line (14) extends partially through the molded article (10). It is contemplated that the depth of the score line (14) will be selected by one of skill in the art depending on application of the molded article (10).

The molded article (10) also has a tensile heal strength of less than 200, more preferably of less than 150, even more preferably of less than 100, and most preferably of less than 50, pounds per inch, along the score line (14). In one embodiment, the molded article (10) has a tensile heal strength of approximately zero pounds per inch along the score line (14) (i.e., there is no self-healing of the first portion (16) and the second portion (18)). For purposes of the instant invention, the terminology "tensile heal strength" is defined as a force per unit area required to separate the first portion (16) from the second portion (18) after scoring.

The tensile heal strength, as defined above, is measured without heat aging the molded article (12). However, heat-aging may be used to accelerate, and more accurately replicate, any potential self-healing of the molded article (10) that may occur after exposure of the molded article (10) to heat, such as in automobiles. If heat aged, the molded article (10) preferably has a heat aged tensile heal strength of less than 200, more preferably of less than 150, even more preferably of less than 100, and most preferably of less than 50, pounds per inch, along the score line (14). For purposes of the present invention, the terminology "heat aged tensile heal strength" is defined as tensile heal strength determined after a heat aging of the molded article (10) at 124° C. for 24 hours.

Preferably, to determine the tensile heal strength and/or the heat aged tensile heal strength, the first portion (16) and the second portion (18) of the molded article (10) are separated and subsequently re-aligned and contacted in their original positions. If determining the tensile heal strength, the first and second portions (16,18) are allowed to stand at room temperature for 24 hours. Alternatively, if determining heat aged tensile heal strength, the first and second portions (16,18) are heat aged at 124° C. for 24 hours. After 24 hours, the force required to separate the first portion (16) from the second portion (18) is then recorded and divided by a thickness of the first and second portions (16,18) to calculate tensile heal strength or heat aged tensile heal strength. Although the aforementioned testing methods of determining tensile heal strength and heat aged tensile heal strength are preferably used, any method known in the art may be utilized.

The molded article (10) is not limited in its physical characteristics so long as the tensile heal strength of the molded article (10) is less than 200 pounds per inch along the score line (14). Accordingly, the molded article (10) may have any density, Shore A durometer hardness, elongation, tensile strength, Graves tear strength, puncture resistance, and Taber abrasion. Preferably, the molded article (10) has a density of from 900 to 1110, more preferably of from 980 to 1110, and most preferably of from 1030 to 1110, kg/M$^3$. The molded article (10) also preferably has a Shore A durometer hardness of from 50 to 100, and more preferably of from 50 to 70, as determined by ASTM D-2240. Further, the molded article (10) preferably has an elongation of greater than 100, more preferably of greater than 150, and most preferably of greater than 175, percent of total stretch, as determined by ASTM D412 Die A. Still further, the molded article (10) preferably has a tensile strength of greater than 500, more preferably of greater than 900, even more preferably of greater than 1200, and most preferably of greater than 1500, psi, as determined by ASTM D412 Die A. Additionally, the molded article (10) preferably has a Graves Tear strength of greater than 60, more preferably of greater than 80, even more preferably of greater than 100, and most preferably greater than 120, pounds of force per linear inch, as determined by ASTM D624 Die C. The molded article (10) also preferably has a puncture resistance of greater than 100, and more preferably of greater than 200, pounds per inch, as determined using a puncture resistance test method. The puncture resistance test method is used to determine the puncture resistance of a specimen of the molded article (10) by measuring a force required to cause a 0.1 inch diameter tip of a sharp-edged puncture probe to penetrate the specimen of the molded article (10). Specifically, a 0.05 inch thick specimen of the molded article (10) is cut such that the specimen has a diameter of 1.2 inches. The specimen is fitted around an orifice of a support instrument and an edge of the specimen is crimped around the orifice to hold the specimen in place. The puncture probe is operated at a speed of 2 inches per minute and punctures the specimen of the molded article (10). The force required to puncture the specimen is measured. The molded article (10) also preferably has a Taber Abrasion resistance of less than 200, and more preferably of less than 100, mg loss, as determined by ASTM D1044.

The molded article (10) includes a cured urethane composition including the reaction product of an isocyanate component and a resin composition comprising a polyol and is formed in a mold having a mold cavity. It is contemplated that the mold may be an open mold or may be a closed mold. Preferably, the mold is an open mold. In a preferred embodiment, the molded article (10) and the cured urethane composition is elastomeric. Without intending to be bound by any particular theory, it is believed that, to reduce tensile heal strength along the score line (14) and to form the molded article (10), the isocyanate component and the resin composition preferably include structurally symmetric molecules such as structurally symmetric isocyanate components and structurally symmetric additives. In one embodiment, the isocyanate component and the resin composition include only structurally symmetric molecules. As is known in the art, structurally symmetric molecules include mirror planes, centers of inversion, rotations about proper axes, or rotations about improper axes.

As such, in the molded article (10), the isocyanate component preferably includes at least one isocyanate and is preferably selected from the group of polymeric methylene diphenyl diisocyanate, 4,4'-methylene diphenyl diisocyanate, 2,4'-methylene diphenyl diisocyanate, and combinations thereof. In one embodiment, the isocyanate component consists essentially of 4,4'-methylene diphenyl diisocyanate. In another embodiment, the isocyanate component consists essentially of polymeric methylene diphenyl diisocyanate. In yet another embodiment, the isocyanate component includes from 98.3 to 100 weight percent of an isomeric mixture 4,4'-methylene diphenyl diisocyanate and 2,4'-methylene diphenyl and from 98.3 to 100 weight percent of essentially pure 4,4'-methylene diphenyl diisocyanate. However, it is contemplated that the isocyanate component may include any amount of the 4,4'-methylene diphenyl diisocyanate and any amount of the polymeric methylene diphenyl diisocyanate, so long as the tensile strength of the molded article (10) is less than 200 pounds per inch along the score line (14). Polymeric methylene diphenyldiisocyanate includes both 4,4'-methylene diphenyl diisocyanate, which is structurally symmetric, and 2,4'-methylene diphenyl diisocyanate, which is structurally asymmetric. However, it is believed that a predominance of 4,4'-methylene diphenyl diisocyanate in the polymeric methylene diphenyldiisocyanate is sufficient to reduce the tensile strength of the molded article (10) and allow the molded article (10) to have the tensile strength of less than 200 pounds per inch along the score line (14). Yet, the polymeric methylene diphenyl diisocyanate is not limited to any particular ratio of 4,4'-methylene diphenyl diisocyanate and 2,4'-methylene diphenyl diisocyanate. In one embodiment, the 2,4'-methylene diphenyl diisocyanate is minimized and preferably zero. Preferred examples of 4,4'-diphenylmethane diisocyanates are commercially available from BASF Corporation of Wyandotte, Mi., under the trade names of Lupranate® MM103, Lupranate® M, Lupranate® MP102, Lupranate® LP30, and Lupranate® LP30D. A preferred example of polymeric methylene diphenyl diisocyanate is commercially available from BASF Corporation of Wyandotte, Mi., under the trade names of Elastoflex® R23000T.

For descriptive purposes only, chemical structures of 4,4'-methylene diphenyl diisocyanate including a plane of symmetry and 2,4'-methylene diphenyl diisocyanate, which is structurally asymmetric, are shown below:

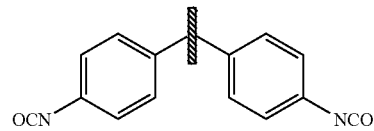

4,4'-diphenylmethane diisocyanate

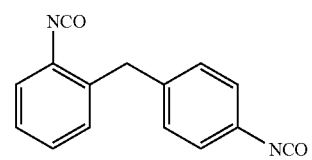

2,4'-diphenylmethane diisocyanate

It is contemplated that the isocyanate component may include more than one individual isocyanate. Any additional isocyanates may be aliphatic or aromatic. If the isocyanate component includes an aromatic isocyanate, the aromatic isocyanate preferably corresponds to the formula R'(NCO)$_z$ wherein R' is a polyvalent organic radical which is aromatic and z is an integer that corresponds to the valence of R'. Preferably, z is at least two. Aromaticity imparts increased reactivity towards the reaction of the isocyanate component and the resin composition. The aromaticity also reduces costs associated with manufacture of the isocyanate component. Aromatic isocyanates that may be used include, but are not limited to, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisochyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 3,3'-dimethyl-4,4'-diphenylmethane diisocyanate, and 3,3'-dimethyldiphenyl-methane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, polymethylene polyphenylene polyisocyanate, corresponding isomeric mixtures thereof, and combinations thereof.

The isocyanate component may also include a modified multivalent aromatic isocyanate, i.e., a product which is obtained through chemical reactions of aromatic diisocyanates and/or aromatic polyisocyanates. Examples include polyisocyanates including, but not limited to, ureas, biurets, allophanates, carbodiimides, uretonimines, and isocyanurate and/or urethane groups including diisocyanates and/or polyisocyanates such as modified diphenylmethane diisocyanates. The isocyanate component may also include, but is not limited to, modified benzene and toluene diisocyanates, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. The isocyanate component may further include stoichiometric or non-stoichiometric reaction products of the aforementioned isocyanates. The isocyanate component may alternatively include an aliphatic isocyanate, and/or combinations of the aromatic isocyanate and the aliphatic isocyanate.

It is contemplated that the isocyanate component may have any % NCO content, any nominal functionality, any number average molecular weight, and any viscosity, depending on which isocyanate component is chosen for use either in the molded article (10) or the methods. Examples of particularly useful isocyanate components of the present invention preferably have % NCO contents of from 8 to 40, more preferably of from 10 to 30, and most preferably of from 20 to 35, percent by weight. Determination of the % NCO contents on percents by weight is accomplished by a standard chemical titration analysis known to those skilled in the art. Also, the particularly useful isocyanate components preferably have nominal functionalities of from 1.7 to 3, more preferably of from 1.9 to 3, and most preferably of from 1.9 to 2.1. Further, these useful isocyanate components preferably have viscosities of from 15 to 2000, more preferably of from 50 to 1000, and most preferably of from 50 to 700, cps at 25° C. It is to be understood that the isocyanate component may have any molecular weight.

Although it is believed that certain isocyanate components either increase or decrease the tensile heal strength of the molded article (10) along the score line (14), the instant invention is not limited by these beliefs. It is contemplated that in all embodiments of the molded article (10), any isocyanate known in the art may be used in the present invention so long as the tensile heal strength of the molded article (10) is less than 200 pounds per inch along the score line (14).

Referring now to the polyol, the polyol may be selected from the group of a polyetherol, a polyesterol, a polycarbonate polyol, and combinations thereof. Preferably, the polyol includes a polyetherol which includes the reaction product of an initiator and an alkylene oxide. Preferably, the initiator is selected from the group of aliphatic initiators, aromatic initiators, and combinations thereof. More preferably, the initiator is selected from the group of ethylene glycol, propylene glycol, dipropylene glycol, trimethylene glycol, 1,2-butanediol, ,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, and combinations thereof. Most preferably, the initiator is selected from the group of glycerol, 1,1,1-trimethylolpropane, and combinations thereof. However, it is contemplated that any suitable initiator known in the art may be used in the present invention.

Preferably, the alkylene oxide that reacts with the initiator to form the polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide such that the polyol includes at least 70 percent by weight of ethylene oxide based on the total weight of the polyol. However, it is also contemplated that any suitable alkylene oxide that is known in the art may be used in the present invention.

In one embodiment, the polyol also preferably includes an ethylene oxide cap of from 5 to 20%, more preferably of from 10 to 20%, and most preferably of from 12 to 20%, by weight based on the total weight of the polyol. In another embodiment, the polyol includes a heteric cap including ethylene oxide and propylene oxide. It is to be understood that the terminology "cap" refers to a terminal portion of the polyol. Without intending to be bound by any particular theory, it is believed that the ethylene oxide cap promotes an increase in a rate of the reaction of the polyol and the isocyanate component. As such, the cap of the polyol allows the polyol and the isocyanate component to be effectively used in impingement mixing and spraying techniques to form the molded article (10) of the instant invention without dripping, contributing to a reduction of production costs. An increased rate of reaction also allows the molded article (10) to be de-molded in a short period of time further reducing production costs.

The polyol also preferably has a number average molecular weight of from 1,500 to 10,000 g/mol. More preferably, the polyol has a number average molecular weight of from 3,000 to 8,000 g/mol. The polyol also preferably has a hydroxyl number of from 20 to 150 mg KOH/g. More preferably, the polyetherol has a hydroxyl number of from 20 to 50, and most preferably of from 24 to 36, mg KOH/g. The polyol also preferably has a nominal functionality of at least 1.5. More preferably, the polyetherol has a nominal functionality of from 2 to 4. Yet, it is contemplated that any polyol known in the art may be used in the present invention. The polyol may include an organic functional group selected from the group of a carboxyl group, an amine group, a carbamate group, an amide group, and an epoxy group. Preferred polyols for use in the present invention includes polyetherols commercially available from BASF Corp. of Wyandotte, M., under the trade names of Pluracol® 816, Pluracol® 1062, and Pluracol® 1538.

The polyol may be present in the resin composition in any amount depending on the hydroxyl number of the polyol and if an additive is included in the resin composition. However, the polyol is preferably present in the resin composition in an amount of from 60 to 100, more preferably of from 60 to 80, and most preferably of from 60 to 70, parts by weight per 100 parts by weight of the resin composition.

The resin composition may also include a second polyol different from the polyol. If the second polyol is included, the second polyol is preferably formed from a reaction of a second initiator and a second alkylene oxide. In one embodiment, the second polyol is a graft polyol and includes polymerized styrene and acrylonitrile.

The resin composition may also include one or more polymerization catalysts. If so, the polymerization catalyst may include an amine. If the polymerization catalyst includes an amine, the amine typically includes, but is not limited to, triethylenediamine, N-methylmorpholine, N-ethylmorpholine, diethylethanolamine, N-cocomorpholine, 1-methyl-4-dimethylaminoethylpiperizine, 3-methoxypropyldimethylamine, N,N,N'-trimethylisopropyl propylenediamine, 3-diethylaminopropyldiethylamine, dimethylbenzylamine, ethylhexanoic acid blocked 1,8-Diazabicyclo[5.4.0]undec-7-ene, and combinations thereof. Preferred polymerization catalysts for use in the instant invention include two commercially available from Air Products and Chemicals, Inc. of Allentown, Pa., under the trade names of DABCO® S-25 and Polycat® SA-102, respectively. The DABCO® S-25 includes triethylenediamine and 1,4 butanediol. The Polycat® SA-102 includes ethylhexanoic acid blocked 1,8-Diazabicyclo[5.4.0] undec-7-ene. Other preferred polymerization catalysts include 1,4-diazabicyclo[2.2.2]octane and is commercially available from Air Products and Chemicals, Inc. of Allentown, Pa., under the trade name of DABCO® 33LV, and Bismuth Zinc Neodecanoate Mixture, commercially available from Shepherd Chemical Company of Cincinnati, Ohio, under the trade name BiCAT® 8.

The polymerization catalysts may also include a metal including, but not limited to, bismuth, potassium, lead, tin, zinc, mercury, titanium, zirconium, hafnium, and combinations thereof. Particularly suitable examples of the polymerization catalyst include, but are not limited to, stannous chloride, dibutyltin di-2-ethyl hexanoate, stannous oxide, dioctyltin dimercaptin, bismuth carboxylate, zinc carboxylate, and combinations thereof.

The polymerization catalysts may be present in the resin composition in any amount. Preferably, at least one polymerization catalyst is present in the resin composition in an amount of less than or equal to 6, more preferably of from 0.02 to 2, and most preferably of from 0.02 to 1.5, parts by weight per 100 parts by weight of the resin composition.

Preferably, if the molded article (10) is elastomeric, the polymerization catalyst does not effectively catalyze an undesirable side reaction of water and humidity with the isocyanate component. Reaction of water and humidity with the isocyanate component forms gaseous carbon dioxide and foams the molded article (10). If the molded article (10) is elastomeric, foaming is undesirable and forms voids and blisters. It is believed that formation of voids and blisters results in a degradation of physical properties of the molded article (10) including a weakened structural stability, a decreased and non-homogeneous density.

The resin composition may further include one or more additives selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, and combinations thereof. The one or more additives may be included in any amount. Preferably, the additives are structurally symmetric. In one embodiment, the resin composition includes only structurally symmetric additives.

The resin composition may include the chain extender as an additive. Examples of preferred chain extenders include compounds having at least two functional groups with active hydrogen atoms including, but not limited to, hydrazine, primary and secondary diamines, alcohols, amino acids, hydroxy acids, glycols, and combinations thereof. Such chain extenders typically have a number average molecular weight of less than about 400 g/mol. However, chain extenders with number average molecular weights of greater than 400 g/mol are also contemplated for use. Preferably, in the molded article (10), a structurally symmetric chain extender is utilized. In one embodiment, the structurally symmetric chain extender includes a diol having less than 6 carbon atoms. An example of a structurally symmetric chain extender having less than 6 carbon atoms is 1,4-butanediol. For descriptive purposes only, chemical structures of 1,4-butanediol showing the plane of symmetry is shown below:

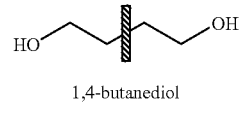

1,4-butanediol

Chain extenders typically act as cross-linking agents and improve physical characteristics of the molded article (10). While an amount of chain extender included in the resin composition is, in large part determined by an anticipated end use of the molded article (10), the resin composition preferably includes of from 1 to 20, more preferably of from 6 to about 15, and most preferably of from 8 to about 15, parts by weight of the chain extender per 100 parts by weight of the resin composition.

Figure 3A:
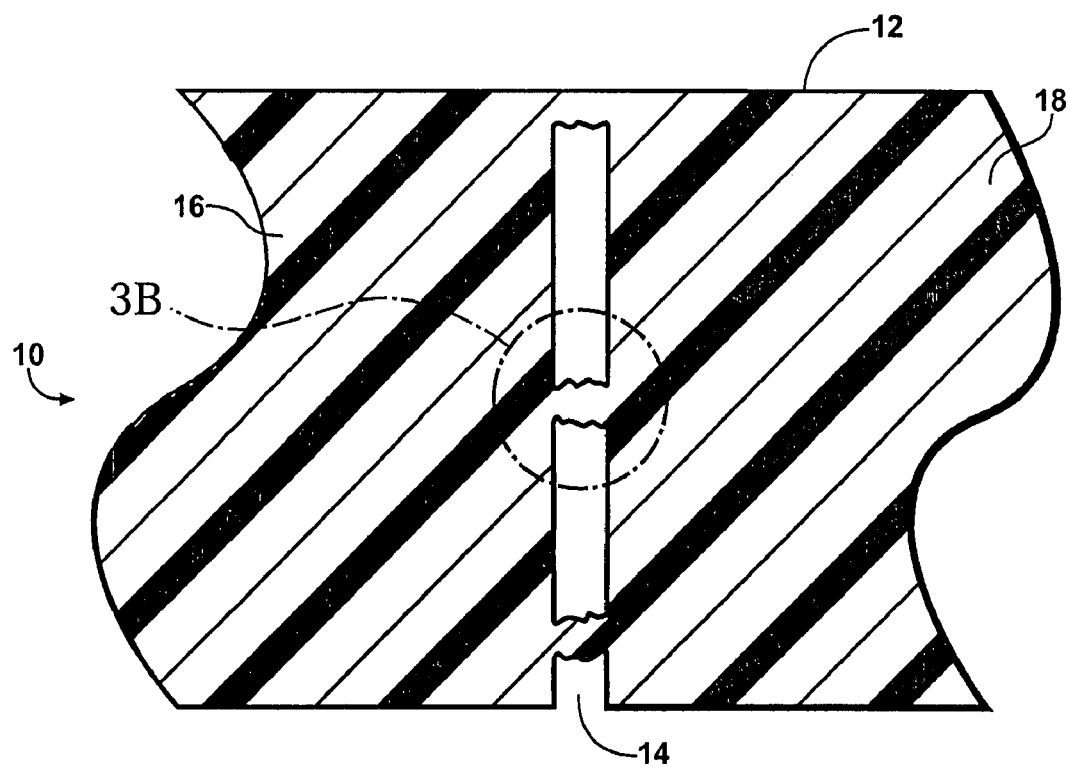
FIG. 3A is a cross-sectional view of the molded article of the present invention illustrating a score line which is partially self-healed.
Figure 3B:
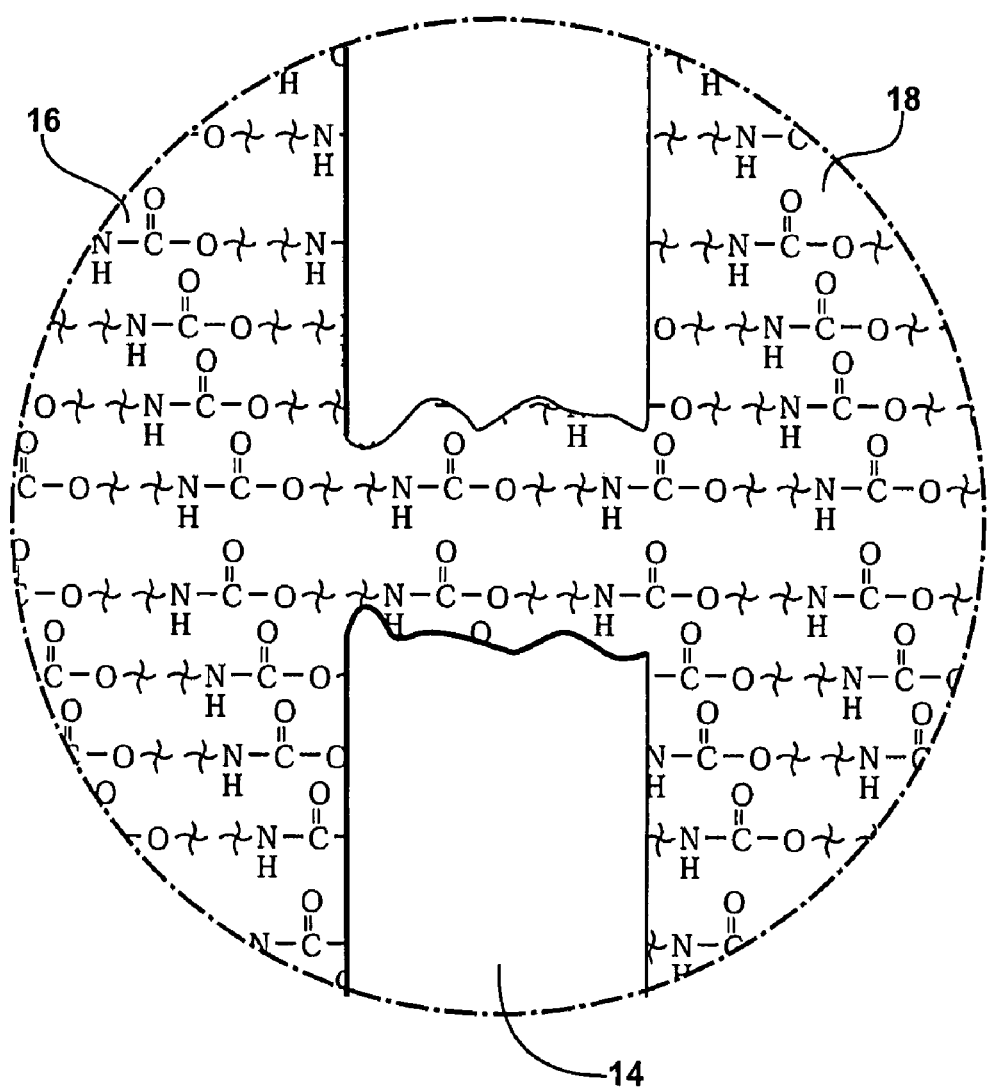
FIG. 3B is a magnified cross-sectional view of the score line of FIG. 3A illustrating molecular interlocking of polyurethane molecules.

Without intending to limit the instant invention, it is believed that the isocyanate component reacts, at least in part, with the chain extender (e.g., the 1,4-butanediol) to form a hard segment having a certain crystallinity (i.e., a degree of molecular order.) It is believed that the crystallinity of the hard segment may also influence the tensile heal strength along the score line (14). Specifically, it is believed that an increased crystallinity of the hard segment reduces and/or minimizes the tensile heal strength as crystalline materials are believed to exhibit less reptation because the molecules of the hard segment are more completely locked into a lattice. Conversely, it is believed that a decreased crystallinity (i.e., increased amorphism) of the hard segment increases and/or maximizes the tensile heal strength because amorphic materials do not have molecules of the hard segment completely locked into a lattice such that the molecules can move through reptation and extend across score lines and cracks thereby becoming entangled, as shown in FIGS. 3A and 3B, which are not drawn to scale. This molecular entanglement is believed to increase tensile heal strength.

The structural symmetry of both the isocyanate component and the chain extender is believed to contribute to the crystallinity of the hard segment. Structurally symmetrical isocyanate components and chain extenders are believed to form hard segments with increased crystallinity thereby decreasing tensile heal strength. Asymmetric isocyanate components and chain extenders are believed to form hard segments with decreased crystallinity thereby increasing tensile heal strength. In accordance with the present invention, the crystallinity of the hard segment may be measured by any means known in the art. Additionally, when polymer chains are unbound by a crystalline structure, the chains are free to vibrate across interfaces and become entangled leading to increases in tensile heal strength.

The resin composition may also include the anti-foaming agent as an additive. If included, the anti-foaming agent preferably includes a silicone liquid commercially available from Dow Corning of Midland, Mi., under the trade name of Antifoam-A. The anti-foaming agent typically acts to reduce the amount of gaseous carbon dioxide formed from the reaction of water and humidity and the isocyanate component. If included in the resin composition, the anti-foaming agent is preferably included in an amount of from 0.01 to 1.00 and most preferably of from 0.1 to 0.7, parts by weight of the anti-foaming agent per 100 parts by weight of the resin composition.

The resin composition may also include the chain terminator as an additive. If included, the chain terminator preferably is an alcohol. More preferably, the chain terminator includes a primary alcohol. Most preferably, the chain terminator includes a blend of $C_{12}$, $C_{13}$, $C_{14}$ and $C_{15}$ high purity primary alcohols commercially available from Shell Chemical LP of Houston, Tex., under the trade name of Neodol® 25. If included in the resin composition, the chain terminator is preferably included in an amount of from 1 to 6, more preferably of from 2 to 4, and most preferably 3, parts by weight of the chain terminator per 100 parts by weight of the resin composition. It is contemplated that the inclusion of certain chain terminators may increase tensile heal strength.

The resin composition may also include the water scavenger as an additive. The water scavenger preferably includes a molecular sieve. Most preferably, the molecular sieve is commercially available from UOP, LLC, of Des Plaines, Il., under the trade name of Molecular Sieve Type 3A. If included in the resin composition, the water scavenger is preferably included in an amount of from 0.1 to 2, more preferably of from 0.1 to 1.5, and most preferably of from 0.1 to 1.2, parts by weight per 100 parts by weight of the resin composition.

The resin composition may also include the fumed silica as the additive. The fumed silica preferably acts as a suspending agent for the water scavenger. The fumed silica is commercially available from Degussa AG of Düsseldorf, Germany, under the trade name of Aerosil® R972. If included in the resin composition, the fumed silica is preferably included in an amount of from 0.2 to 1.5 parts by weight per 100 parts by weight of the resin composition.

Depending on application of the molded article (10), the molded article (10) may include a single layer or may include multiple layers. If the molded article (10) includes the single layer, the single layer includes the cured urethane composition. If the molded article (10) includes multiple layers, the layers may be the same or may be different. In one embodiment, the molded article (10) includes a first layer and a second layer disposed on the first layer. In this embodiment the second layer may be disposed in contact with the first layer, or may be separated from the first layer. Preferably, the second layer, if included, serves as a support layer for the first layer and preferably includes a second cured urethane composition that is different from the cured urethane composition. In one embodiment, the second layer is foamed. However, it is contemplated that the second layer may be elastomeric. Additionally, the single layer and the optional multiple layers may have any thickness. Preferably, the single layer has a thickness of from 0.01 to 0.1, more preferably of from 0.03 to 0.08, and most preferably of from 0.04 to 0.07, inches. If the additional layers are utilized, the additional layers preferably have thicknesses of from 0.25 to 4, more preferably of from 1 to 3, and most preferably of from 1 to 2.5, inches.

The present invention also provides a method of forming the molded article (10) to self-heal. This method preferably reduces an ability of the molded article (10) to self-heal. This method includes the step of applying the isocyanate component and the resin composition including the polyol into the mold cavity. In this method, the isocyanate component and the resin composition are preferably sprayed into the mold cavity. However, before the isocyanate component and the resin composition are applied into the mold cavity, it is contemplated that the mold cavity may be coated with a known mold release agent to facilitate an eventual de-molding of the molded article (10). The mold release agent may be applied into the mold cavity by any method known in the art including, but not limited to, manual and/or automatic spraying, pouring, placing, and combinations thereof. If utilized, the mold release agent may include, but is not limited to, silicones, soaps, waxes, solvents, and combinations thereof.

Alternatively, or in addition to application of the mold release agent, a coating composition having a predetermined color may be sprayed or poured into the mold cavity. The coating composition may be selected from a variety of water and solvent borne solutions. The coating composition may also include a one or multi-component composition. Among the numerous available coating compositions which are suitable for use in the present invention, the most preferred coating compositions for use in the present invention include Protothane®, commercially available from Titan Finishes Corporation of Detroit, Mi., Polane®, commercially available from Sherwin Williams, Inc. of Cleveland, Ohio, and Rimbond®, commercially available from Lilly Corporation of Aurora, Il. The coating composition may be manually and/or automatically sprayed or poured into the mold cavity in any amount depending on desired characteristics of the molded article (10), as determined by one skilled in the art.

Preferably, after applying the mold release agent and prior to spraying the isocyanate component and the resin composition into the mold cavity, the isocyanate component and resin composition are mixed by impingement mixing in a head of a spray gun. Impingement mixing includes mixing streams of the isocyanate component and the resin composition under pressure in the head of the spray gun. The isocyanate component and the resin composition may be mixed at any temperature and at any pressure in the head of the spray gun. Preferably, the isocyanate component and the resin composition are mixed at a temperature of greater than 100° F. and more preferably at a temperature of approximately 150° F., and at a pressure of greater than 1,000 psi and more preferably at a pressure of approximately 1,500 psi.

Referring back to the step of applying the isocyanate component and the resin composition into the mold cavity, the isocyanate component and the resin composition may be applied over the mold release agent and/or coating composition if present and, in the absence thereof, directly into the mold cavity. The isocyanate component and the resin composition may be applied into the mold cavity by any method known in the art, including, but not limited to, spraying, pouring, and combinations thereof. Preferably, the step of applying the isocyanate component and the resin composition includes the step of spraying at least one of the isocyanate component and the resin composition. If sprayed, the isocyanate component and/or resin composition may be sprayed with one of a cone nozzle or a fan nozzle.

If either of the isocyanate component and/or the resin composition is sprayed, spray processing parameters may be manipulated. The spray processing parameters that are typically manipulated include, but are not limited to, a temperature and pressure of the isocyanate component and/or the resin composition entering the spray gun and a throughput of the spray gun. The temperature is preferably maintained between 25 and 85, and more preferably between 55 and 74,° C. Similarly, if the pressure of the isocyanate component and/or the resin composition entering the spray gun is manipulated, the pressure is preferably maintained between 700 and 1500, and more preferably between 900 and 1100, psi. Also, if the throughput of the spray gun is manipulated, the throughput is preferably maintained between 5 and 50, and most preferably between 17 and 40, g/sec. Preferably, each of the aforementioned spray processing parameters may be optimized for use when either the isocyanate component and/or the resin composition has a viscosity of up to 20,000, and more preferably of from 200 to 4,000, cps at 25° C.

During application of the isocyanate component and the resin composition into the mold cavity, it is understood by those skilled in the art that the amount of water and humidity present in the mold cavity is an important condition to be considered when making the molded article (10). If the molded article (10) is elastomeric, some water and humidity may be present without adversely affecting the isocyanate component and the resin composition. Typically, the isocyanate component and the resin composition are applied into the mold cavity in the presence of less than 100, more typically of less than 17, even more typically of less than 14, and most typically of less than 7, grains/pound absolute humidity, when forming the molded article (10) that is elastomeric.

This method also includes the step of reacting the isocyanate component and the resin composition to form a urethane composition. The isocyanate component and the resin composition may be reacted at any temperature and at any pressure to form the urethane composition, as selected by one skilled in the art. Although the isocyanate component and the resin composition spontaneously react, reaction may be delayed and non-ideal. As such, the isocyanate component and the resin composition are preferably reacted at a temperature of greater than 100° F. and more preferably at a temperature of approximately 150° F., and at a pressure of approximately 760 torr. The isocyanate component and the resin composition may also be reacted at any isocyanate index, as determined by one skilled in the art. Preferably, the step of reacting the isocyanate component and the resin composition includes the step of reacting the isocyanate component and the resin composition at an isocyanate index of from 90 to 115, more preferably of from 95 to 105, and most preferably of from 98 to 102. It is to be understood that the isocyanate component and the resin composition may begin reacting in the head of the spray gun and may continue to react while being applied and/or sprayed and after. It is contemplated that the isocyanate component and the resin composition may not begin to react until mixed.

This method further includes the step of curing the urethane composition to form the cured urethane composition, first introduced above. The urethane composition may be cured at any temperature and for any time. Preferably, the step of curing the urethane composition includes the step of curing at a temperature of at least 60, more preferably of from 60 to 80, and most preferably from 65 to 75, ° C., and preferably for a time of 1 minute, more preferably for 2 minutes, and most preferably for 5 minutes.

Still further, the method includes the step of de-molding the molded article (10) from the mold cavity. In addition to this step, the method also includes the step of scoring the molded article (10) within the periphery (12) to form the score line (14) having the tensile heal strength of less than 200 pounds per inch along the score line (14). It is to be understood that the molded article (10) may be scored within the periphery (12) prior to demolding the molded article (10), i.e., while the molded article (10) is still in the mold, or after the molded article (10) is demolded. It is also contemplated that the molded article (10) may be scored while in the mold and scored again after being demolded. The step of scoring can be accomplished via any means known in the art including, but not limited to, scoring via hand or via machine and with a knife or other suitable scoring instrument. In this method, the isocyanate component, resin composition, and the additives are preferably the same as described above. Although it is believed that certain isocyanate components and additives either increase or decrease the tensile heal strength of the molded article (10) along the score line (14), the instant invention is not limited by these beliefs. It is contemplated that in all embodiments of the method, any isocyanate known in the art may be used in the present invention. Preferably, an isocyanate that reduces the ability of the molded article (10) to self-heal is used.

In another embodiment of the method, the ability of the molded article (10) to self-heal can either be increased or decreased, corresponding to an increased tensile heal strength and a decreased tensile heal strength, respectively. This embodiment includes the step of determining a theoretical tensile heal strength along the score line (14) and the step of applying the isocyanate component into the mold cavity in response to the determining of the theoretical tensile heal strength. It is contemplated that the theoretical tensile heal strength will fluctuate depending on a choice of the isocyanate component (e.g., polymeric methylene diphenyl diisocyanate, 4,4'-methylene diphenyl diisocyanate, and/or 2,4'-methylene diphenyl diisocyanate). The theoretical tensile heal strength can be determined by any method known in the art. Preferably, the theoretical tensile heal strength is determined using an algorithm which utilizes variables corresponding to a type of isocyanate component. However, it is also contemplated that the theoretical tensile heal strength can be determined by one of skill in the art based on experience or can be determined by various calculations based on chemical reactivity and bonding of the isocyanate component and the resin composition.

The step of determining a theoretical tensile heal strength along the score line may include the step of determining a suitable isocyanate component for use in effecting the theoretical tensile heal strength along the score line. Also, the step of applying the isocyanate component into the mold cavity in response to the determining of the theoretical tensile heal strength preferably includes the step of applying the suitable isocyanate component into the mold cavity.

In addition to the aforementioned steps, this method also includes the steps of applying the resin composition including the polyol into the mold cavity, reacting the isocyanate component and the resin composition to form the urethane composition, curing the urethane composition, and de-molding the molded article (10) from the mold cavity, as first described above. This method may also include the step of scoring the molded article (10) within the periphery to form the score line (14). If so, the molded article (10) may be scored before or after de-molding. According to this method, the tensile heal strength of the molded article (10) may be influenced to be greater than 200 pounds per inch along the score line (14).

In this method, if one skilled in the art desires to decrease the ability of the molded article (10) to self-heal and decrease the tensile heal strength, the isocyanate component, the resin composition, and the additive is preferably the same as described above. Conversely, if one skilled in the art desires to increase the ability of the molded article (10) to self-heal and increase the tensile heal strength, the isocyanate component and the resin composition preferably include structurally asymmetric molecules such as structurally asymmetric isocyanate components and structurally asymmetric additives. In one embodiment, the isocyanate component and the resin composition include only structurally asymmetric molecules. Structurally asymmetric molecules, as known in the art, do not include planes of symmetry, centers of inversion, or rotations about axes. As such, the isocyanate component may include 2,4'-methylene diphenyl diisocyanate. Alternatively, the isocyanate component may consist essentially of 2,4'-methylene diphenyl diisocyanate. Further, if one skilled in the art desires to increase the ability of the molded article (10) to self heal, a structurally asymmetric chain extender is preferably utilized as it is believed that the asymmetry contributes to an increase in the tensile heal strength. It is contemplated that the resin composition may include only structurally asymmetric additives. An example of a structurally asymmetric chain extender is 1,3-butanediol. 1,3-butanediol is commercially available from GE Silicones of Wilton, Conn., under the trade name of NIAX® Processing Additive DP-1022. Although it is believed that certain isocyanate components and additives either increase or decrease the tensile heal strength of the molded article (10) along the score line (14), the instant invention is not limited by these beliefs. It is contemplated that in all embodiments of the method, any isocyanate known in the art may be used in the present invention so long as the desired result of influencing (i.e., either increasing or decreasing) the ability of the molded article (10) to self-heal is achieved.

EXAMPLES

A series of molded articles, (Molded Articles 1 through 32) are formed and scored and have a tensile heal strength of less than 200 pounds per inch along a score line, according to the present invention. A single comparative Molded Article (Comparative Molded Article 1) is also formed and scored but not as the Molded Article of the present invention. The Comparative Molded Article 1 does not have a tensile heal strength of less than 200 pounds per inch along a score line. Two additional Molded Articles (Molded Articles 33 and 34) are also formed and scored and have increased tensile heal strengths along the score lines as a result of utilizing the method of the present invention.

The Molded Articles 1 through 9 are formed via hand-mixing a first resin composition and a first isocyanate component including three isocyanates (Isocyanates 1 through 3) in differing amounts. The first resin composition includes two polyols (Polyols 1 and 2), three Polymerization Catalysts (Polymerization Catalysts 1 through 3), a Chain Extender, Fumed Silica, a Water Scavenger, and an Anti-Foaming Agent.

The Molded Articles 10 through 20 and 33 and 34 are formed via hand-mixing a second resin composition and a second isocyanate component including three isocyanates (Isocyanates 3 through 5) in differing amounts. The second resin composition includes a single polyol (Polyol 1), three polymerization catalysts (Polymerization Catalysts 2, 3, and 4), the Chain Extender, the Water Scavenger, the Fumed Silica, and the Anti-Foaming Agent.

The Molded Articles 21 through 32 are formed via hand-mixing a third resin composition and a third isocyanate component including three isocyanates (Isocyanates 1, 3, and 4) in differing amounts. The third resin composition includes a single polyol (polyol 3), three Polymerization Catalysts (Polymerization Catalysts 2 through 4), the Chain Extender, the Water Scavenger, the Fumed Silica, and the Anti-Foaming Agent.

The Comparative Molded Article 1 is formed via hand-mixing a fourth resin composition and a fourth isocyanate component including one isocyanate (Isocyanate 2). The fourth resin composition includes two polyols (Polyols 1 and 2), three Polymerization Catalysts (Polymerization Catalysts 1 through 3), the Chain Extender, the Fumed Silica, the Water Scavenger, and the Anti-Foaming Agent.

To form the Molded Articles 1 through 34 and the Comparative Molded Article 1, the respective isocyanate components and resin compositions are mixed together in separate 400 ml plastic beakers for 20 seconds to form a series of mixtures, Mixtures 1 through 34 and Comparative Mixture 1, respectively. Subsequently, a portion is removed from each of the Mixtures 1 through 34 and the Comparative Mixture 1, and is spread out on a tool heated to 68° C., de-molded after 5 minutes, and allowed to cure for 48 hours at room temperature to form the Molded Articles 1 through 34 and the Comparative Molded Article 1, respectively. Amounts of the Polyols, the Isocyanates, the Polymerization Catalysts, the Chain Extender, the Water Scavenger, the Fumed Silica, and the Anti-Foaming Agent that are used to form the Molded Articles 1 through 34 and the Comparative Molded Article 1, in addition to isocyanate indices and % NCO of the isocyanates, are set forth in Table 1. All amounts are parts by weight based on the total weight of the resin composition, unless otherwise noted. The total amounts of Isocyanates 1 through 5 are based on 100 parts of the resin composition.

TABLE 1

| | Component | Molded Article 1 | Molded Article 2 | Molded Article 3 | Molded Article 4 |
|---|---|---|---|---|---|
| Resin Composition | Polyol 1 | 74.36 | 74.36 | 74.36 | 74.36 |
| | Polyol 2 | 12.07 | 12.07 | 12.07 | 12.07 |
| | Polyol 3 | 0 | 0 | 0 | 0 |
| | Chain Extender | 10.58 | 10.58 | 10.58 | 10.58 |
| | Polymerization | 1.06 | 1.06 | 1.06 | 1.06 |

TABLE 1-continued

|  | Component | | | | |
|---|---|---|---|---|---|
|  | Catalyst 1 | | | | |
|  | Polymerization Catalyst 2 | 0.03 | 0.03 | 0.03 | 0.03 |
|  | Polymerization Catalyst 3 | 0.05 | 0.05 | 0.05 | 0.05 |
|  | Polymerization Catalyst 4 | 0 | 0 | 0 | 0 |
|  | Fumed Silica | 0.11 | 0.11 | 0.11 | 0.11 |
|  | Water Scavenger | 1.06 | 1.06 | 1.06 | 1.06 |
|  | Anti-Foaming Agent | 0.69 | 0.69 | 0.69 | 0.69 |
|  | Total | 100.01 | 100.01 | 100.01 | 100.01 |
| Isocyanate Component | Percentage of Isocyanate 1 | 43 | 0 | 35 | 85 |
|  | Percentage of Isocyanate 2 | 43 | 85 | 35 | 0 |
|  | Percentage of Isocyanate 3 | 14 | 15 | 30 | 15 |
|  | Percentage of Isocyanate 4 | 0 | 0 | 0 | 0 |
|  | Percentage of Isocyanate 5 | 0 | 0 | 0 | 0 |
|  | Total Amount of Isocyanates 1 through 5 | 46.47 | 51.86 | 45.16 | 42.09 |
|  | Isocyanate Index | 100 | 100 | 100 | 100 |
|  | % NCO | 26.98 | 24.18 | 27.76 | 29.79 |
|  | Total | 100 | 100 | 100 | 100 |

|  | Component | Molded Article 5 | Molded Article 6 | Molded Article 7 | Molded Article 8 |
|---|---|---|---|---|---|
| Resin Composition | Polyol 1 | 74.36 | 74.36 | 74.36 | 74.36 |
|  | Polyol 2 | 12.07 | 12.07 | 12.07 | 12.07 |
|  | Polyol 3 | 0 | 0 | 0 | 0 |
|  | Chain Extender | 10.58 | 10.58 | 10.58 | 10.58 |
|  | Polymerization Catalyst 1 | 1.06 | 1.06 | 1.06 | 1.06 |
|  | Polymerization Catalyst 2 | 0.03 | 0.03 | 0.03 | 0.03 |
|  | Polymerization Catalyst 3 | 0.05 | 0.05 | 0.05 | 0.05 |
|  | Polymerization Catalyst 4 | 0 | 0 | 0 | 0 |
|  | Fumed Silica | 0.11 | 0.11 | 0.11 | 0.11 |
|  | Water Scavenger | 1.06 | 1.06 | 1.06 | 1.06 |
|  | Anti-Foaming Agent | 0.69 | 0.69 | 0.69 | 0.69 |
|  | Total | 100.01 | 100.01 | 100.01 | 100.01 |
| Isocyanate Component | Percentage of Isocyanate 1 | 100 | 0 | 70 | 70 |
|  | Percentage of Isocyanate 2 | 0 | 70 | 0 | 0 |
|  | Percentage of Isocyanate 3 | 0 | 30 | 30 | 30 |
|  | Percentage of Isocyanate 4 | 0 | 0 | 0 | 0 |
|  | Percentage of Isocyanate 5 | 0 | 0 | 0 | 0 |
|  | Total Amount of Isocyanates 1 through 5 | 42.50 | 49.26 | 41.69 | 41.69 |
|  | Isocyanate Index | 100 | 100 | 100 | 100 |
|  | % NCO | 29.5 | 25.45 | 30.07 | 30.07 |
|  | Total | 100 | 100 | 100 | 100 |

|  | Component | Molded Article 9 | Molded Article 10 | Molded Article 11 | Molded Article 12 |
|---|---|---|---|---|---|
| Resin Composition | Polyol 1 | 74.36 | 86.34 | 86.34 | 86.34 |
|  | Polyol 2 | 12.07 | 0 | 0 | 0 |
|  | Polyol 3 | 0 | 0 | 0 | 0 |
|  | Chain Extender | 10.58 | 11.00 | 11.00 | 11.00 |
|  | Polymerization Catalyst 1 | 1.06 | 0 | 0 | 0 |
|  | Polymerization | 0.03 | 0.02 | 0.02 | 0.02 |

TABLE 1-continued

|  | Component |  |  |  |  |
|---|---|---|---|---|---|
|  | Catalyst 2 |  |  |  |  |
|  | Polymerization Catalyst 3 | 0.05 | 0.04 | 0.04 | 0.04 |
|  | Polymerization Catalyst 4 | 0 | 0.90 | 0.90 | 0.90 |
|  | Fumed Silica | 0.11 | 0.60 | 0.60 | 0.60 |
|  | Water Scavenger | 1.06 | 1.00 | 1.00 | 1.00 |
|  | Anti-Foaming Agent | 0.69 | 0.10 | 0.10 | 0.10 |
|  | Total | 100.01 | 100.00 | 100.00 | 100.00 |
| Isocyanate Component | Percentage of Isocyanate 1 | 0 | 0 | 0 | 0 |
|  | Percentage of Isocyanate 2 | 70 | 0 | 0 | 0 |
|  | Percentage of Isocyanate 3 | 30 | 100 | 30 | 0 |
|  | Percentage of Isocyanate 4 | 0 | 0 | 0 | 70 |
|  | Percentage of Isocyanate 5 | 0 | 0 | 70 | 30 |
|  | Total Amount of Isocyanates 1 through 5 | 49.26 | 42.76 | 40.76 | 40.04 |
|  | Isocyanate Index | 100 | 100 | 100 | 100 |
|  | % NCO | 25.45 | 31.4 | 32.94 | 33.53 |
|  | Total | 100 | 100 | 100 | 100 |

|  | Component | Molded Article 13 | Molded Article 14 | Molded Article 15 | Molded Article 16 |
|---|---|---|---|---|---|
| Resin Composition | Polyol 1 | 86.34 | 86.34 | 86.34 | 86.34 |
|  | Polyol 2 | 0 | 0 | 0 | 0 |
|  | Polyol 3 | 0 | 0 | 0 | 0 |
|  | Chain Extender | 11.00 | 11.00 | 11.00 | 11.00 |
|  | Polymerization Catalyst 1 | 0 | 0 | 0 | 0 |
|  | Polymerization Catalyst 2 | 0.02 | 0.02 | 0.02 | 0.02 |
|  | Polymerization Catalyst 3 | 0.04 | 0.04 | 0.04 | 0.04 |
|  | Polymerization Catalyst 4 | 0.90 | 0.90 | 0.90 | 0.90 |
|  | Fumed Silica | 0.60 | 0.60 | 0.60 | 0.60 |
|  | Water Scavenger | 1.00 | 1.00 | 1.00 | 1.00 |
|  | Anti-Foaming Agent | 0.10 | 0.10 | 0.10 | 0.10 |
|  | Total | 100.00 | 100.00 | 100.00 | 100.00 |
| Isocyanate Component | Percentage of Isocyanate 1 | 0 | 0 | 0 | 0 |
|  | Percentage of Isocyanate 2 | 0 | 0 | 0 | 0 |
|  | Percentage of Isocyanate 3 | 33.33 | 73 | 39 | 70 |
|  | Percentage of Isocyanate 4 | 33.33 | 27 | 33 | 0 |
|  | Percentage of Isocyanate 5 | 33.33 | 0 | 28 | 30 |
|  | Total Amount of Isocyanates 1 through 5 | 40.89 | 42 | 41.05 | 41.88 |
|  | Isocyanate Index | 100 | 100 | 100 | 100 |
|  | % NCO | 32.83 | 31.97 | 32.71 | 32.06 |
|  | Total | ~100 | 100 | 100 | 100 |

|  | Component | Molded Article 17 | Molded Article 18 | Molded Article 19 | Molded Article 20 |
|---|---|---|---|---|---|
| Resin Composition | Polyol 1 | 86.34 | 86.34 | 86.34 | 86.34 |
|  | Polyol 2 | 0 | 0 | 0 | 0 |
|  | Polyol 3 | 0 | 0 | 0 | 0 |
|  | Chain Extender | 11 | 11.00 | 11.00 | 11.00 |
|  | Polymerization Catalyst 1 | 0 | 0 | 0 | 0 |
|  | Polymerization Catalyst 2 | 0.02 | 0.02 | 0.02 | 0.02 |
|  | Polymerization | 0.04 | 0.04 | 0.04 | 0.04 |

TABLE 1-continued

|  |  | | | | |
|---|---|---|---|---|---|
|  | Catalyst 3 | | | | |
|  | Polymerization Catalyst 4 | 0.90 | 0.90 | 0.90 | 0.90 |
|  | Fumed Silica | 0.60 | 0.60 | 0.60 | 0.60 |
|  | Water Scavenger | 1.00 | 1.00 | 1.00 | 1.00 |
|  | Anti-Foaming Agent | 0.10 | 0.10 | 0.10 | 0.10 |
|  | Total | 100.00 | 100.00 | 100.00 | 100.00 |
| Isocyanate Component | Percentage of Isocyanate 1 | 0 | 0 | 0 | 0 |
|  | Percentage of Isocyanate 2 | 0 | 0 | 0 | 0 |
|  | Percentage of Isocyanate 3 | 100 | 0 | 30 | 30 |
|  | Percentage of Isocyanate 4 | 0 | 100 | 70 | 70 |
|  | Percentage of Isocyanate 5 | 0 | 0 | 0 | 0 |
|  | Total Amount of Isocyanates 1 through 5 | 42.76 | 40.08 | 40.85 | 40.85 |
|  | Isocyanate Index | 100 | 100 | 100 | 100 |
|  | % NCO | 31.40 | 33.5 | 32.87 | 32.87 |
|  | Total | 100 | 100 | 100 | 100 |

|  | Component | Molded Article 21 | Molded Article 22 | Molded Article 23 | Molded Article 24 |
|---|---|---|---|---|---|
| Resin Composition | Polyol 1 | 0 | 0 | 0 | 0 |
|  | Polyol 2 | 0 | 0 | 0 | 0 |
|  | Polyol 3 | 86.34 | 86.34 | 86.34 | 86.34 |
|  | Chain Extender | 11.00 | 11.00 | 11.00 | 11.00 |
|  | Polymerization Catalyst 1 | 0 | 0 | 0 | 0 |
|  | Polymerization Catalyst 2 | 0.02 | 0.02 | 0.02 | 0.02 |
|  | Polymerization Catalyst 3 | 0.04 | 0.04 | 0.04 | 0.04 |
|  | Polymerization Catalyst 4 | 0.90 | 0.90 | 0.90 | 0.90 |
|  | Fumed Silica | 0.60 | 0.60 | 0.60 | 0.60 |
|  | Water Scavenger | 1.00 | 1.00 | 1.00 | 1.00 |
|  | Anti-Foaming Agent | 0.10 | 0.10 | 0.10 | 0.10 |
|  | Total | 100 | 100 | 100 | 100 |
| Isocyanate Component | Percentage of Isocyanate 1 | 0 | 0 | 100 | 0 |
|  | Percentage of Isocyanate 2 | 0 | 0 | 0 | 0 |
|  | Percentage of Isocyanate 3 | 0 | 67 | 0 | 33 |
|  | Percentage of Isocyanate 4 | 100 | 33 | 0 | 67 |
|  | Percentage of Isocyanate 5 | 0 | 0 | 0 | 0 |
|  | Total Amount of Isocyanates 1 through 5 | 41.5 | 43.32 | 47.13 | 42.37 |
|  | Isocyanate Index | 100 | 100 | 100 | 100 |
|  | % NCO | 33.5 | 32.09 | 29.50 | 32.81 |
|  | Total | 100 | 100 | 100 | 100 |

|  | Component | Molded Article 25 | Molded Article 26 | Molded Article 27 | Molded Article 28 |
|---|---|---|---|---|---|
| Resin Composition | Polyol 1 | 0 | 0 | 0 | 0 |
|  | Polyol 2 | 0 | 0 | 0 | 0 |
|  | Polyol 3 | 86.34 | 86.34 | 86.34 | 86.34 |
|  | Chain Extender | 11.00 | 11.00 | 11.00 | 11.00 |
|  | Polymerization Catalyst 1 | 0 | 0 | 0 | 0 |
|  | Polymerization Catalyst 2 | 0.02 | 0.02 | 0.02 | 0.02 |
|  | Polymerization Catalyst 3 | 0.04 | 0.04 | 0.04 | 0.04 |
|  | Polymerization Catalyst 4 | 0.90 | 0.90 | 0.90 | 0.90 |

TABLE 1-continued

|  | Component | | | | |
|---|---|---|---|---|---|
|  | Catalyst 4 | | | | |
|  | Fumed Silica | 0.60 | 0.60 | 0.60 | 0.60 |
|  | Water Scavenger | 1.00 | 1.00 | 1.00 | 1.00 |
|  | Anti-Foaming Agent | 0.10 | 0.10 | 0.10 | 0.10 |
|  | Total | 100 | 100 | 100 | 100 |
| Isocyanate Component | Percentage of Isocyanate 1 | 33 | 33 | 67 | 33.33 |
|  | Percentage of Isocyanate 2 | 0 | 0 | 0 | 0 |
|  | Percentage of Isocyanate 3 | 67 | 0 | 33 | 33.33 |
|  | Percentage of Isocyanate 4 | 0 | 67 | 0 | 33.33 |
|  | Percentage of Isocyanate 5 | 0 | 0 | 0 | 0 |
|  | Total Amount of Isocyanates 1 through 5 | 45.17 | 43.20 | 46.15 | 44.18 |
|  | Isocyanate Index | 100 | 100 | 100 | 100 |
|  | % NCO | 30.77 | 32.18 | 30.13 | 31.47 |
|  | Total | 100 | 100 | 100 | ~100 |

|  | Component | Molded Article 29 | Molded Article 30 | Molded Article 31 | Molded Article 32 |
|---|---|---|---|---|---|
| Resin Composition | Polyol 1 | 0 | 0 | 0 | 0 |
|  | Polyol 2 | 0 | 0 | 0 | 0 |
|  | Polyol 3 | 86.34 | 86.34 | 86.34 | 86.34 |
|  | Chain Extender | 11.00 | 11.00 | 11.00 | 11.00 |
|  | Polymerization Catalyst 1 | 0 | 0 | 0 | 0 |
|  | Polymerization Catalyst 2 | 0.02 | 0.02 | 0.02 | 0.02 |
|  | Polymerization Catalyst 3 | 0.04 | 0.04 | 0.04 | 0.04 |
|  | Polymerization Catalyst 4 | 0.90 | 0.90 | 0.90 | 0.90 |
|  | Fumed Silica | 0.60 | 0.60 | 0.60 | 0.60 |
|  | Water Scavenger | 1.00 | 1.00 | 1.00 | 1.00 |
|  | Anti-Foaming Agent | 0.10 | 0.10 | 0.10 | 0.10 |
|  | Total | 100 | 100 | 100 | 100 |
| Isocyanate Component | Percentage of Isocyanate 1 | 0 | 67 | 0 | 0 |
|  | Percentage of Isocyanate 2 | 0 | 0 | 0 | 0 |
|  | Percentage of Isocyanate 3 | 100 | 0 | 67 | 33 |
|  | Percentage of Isocyanate 4 | 0 | 33 | 33 | 67 |
|  | Percentage of Isocyanate 5 | 0 | 0 | 0 | 0 |
|  | Total Amount of Isocyanates 1 through 5 | 44.27 | 45.11 | 43.32 | 42.38 |
|  | Isocyanate Index | 100 | 100 | 100 | 100 |
|  | % NCO | 31.4 | 30.82 | 32.09 | 32.81 |
|  | Total | 100 | 100 | 100 | 100 |

|  | Component | Comp. Molded Article 1 | Molded Article 33 | Molded Article 34 |
|---|---|---|---|---|
| Resin Composition | Polyol 1 | 74.36 | 86.34 | 86.34 |
|  | Polyol 2 | 12.07 | 0 | 0 |
|  | Polyol 3 | 0 | 0 | 0 |
|  | Chain Extender | 10.58 | 11.00 | 11.00 |
|  | Polymerization Catalyst 1 | 1.06 | 0 | 0 |
|  | Polymerization Catalyst 2 | 0.03 | 0.02 | 0.02 |
|  | Polymerization Catalyst 3 | 0.05 | 0.04 | 0.04 |
|  | Polymerization Catalyst 4 | 0 | 0.90 | 0.90 |

TABLE 1-continued

|  |  |  |  |  |
|---|---|---|---|---|
|  | Catalyst 4 |  |  |  |
|  | Fumed Silica | 0.11 | 0.60 | 0.60 |
|  | Water | 1.06 | 1.00 | 1.00 |
|  | Scavenger |  |  |  |
|  | Anti-Foaming | 0.69 | 0.10 | 0.10 |
|  | Agent |  |  |  |
|  | Total | 100.01 | 100.00 | 100.00 |
| Isocyanate Component | Percentage of Isocyanate 1 | 0 | 0 | 0 |
|  | Percentage of Isocyanate 2 | 100 | 0 | 0 |
|  | Percentage of Isocyanate 3 | 0 | 0 | 0 |
|  | Percentage of Isocyanate 4 | 0 | 0 | 27 |
|  | Percentage of Isocyanate 5 | 0 | 100 | 73 |
|  | Total Amount of Isocyanates 1 through 5 | 54.75 | 39.96 | 39.99 |
|  | Isocyanate Index | 100 | 100 | 100 |
|  | % NCO | 22.9 | 33.6 | 33.57 |
|  | Total | 100 | 100 | 100 |

The Polyol 1, commercially available from BASF Corporation of Wyandotte, Mi., under the trade name of Pluracol® 816, is a high molecular weight triol that has a number average molecular weight of 4,800 g/mol, a hydroxyl number of 34 to 36 mg KOH/g, and a nominal functionality of 3.

The Polyol 2, commercially available from BASF Corporation of Wyandotte, Mi., under the trade name of Pluracol® 1062, is a high molecular weight, primary hydroxyl terminated diol that has a number average molecular weight of 4,000 g/mol, a hydroxyl number of 28 to 30 mg KOH/g, and a nominal functionality of 2.

The Polyol 3, commercially available from BASF Corporation of Wyandotte, Mi., under the trade name of Pluracol® 1538, is a high molecular weight primary hydroxyl terminated polyol that has a number average molecular weight of 3,000 g/mol, a hydroxyl number of from 55 to 57 mg KOH/g, and a nominal functionality of 3.

The Chain Extender is 1,4-butanediol.

The Polymerization Catalyst 1 is 1,4-diazabicyclo[2.2.2] octane and is commercially available from Air Products and Chemicals, Inc. of Allentown, Pa., under the trade name of DABCO® 33LV.

The Polymerization Catalyst 2 is Bismuth Zinc Neodecanoate Mixture and is commercially available from Shepherd Chemical Company of Cincinnati, Ohio, under the trade name BiCAT® 8.

The Polymerization Catalyst 3 is a delayed-action, heat-activated catalyst based on 1,8 diaza-bicyclo (5,4,0) undecene-7 and is commercially available from Air Products and Chemicals, Inc. of Allentown, Pa., under the trade name of Polycat® SA-102.

The Polymerization Catalyst 4 includes triethylenediamine and 1,4 butanediol and is commercially available from Air Products and Chemicals, Inc. of Allentown, Pa., under the trade name of DABCO® S-25.

The Fumed Silica is commercially available from Degussa AG of Düsseldorf, Germany, under the trade name of Aerosil® R972.

The Water Scavenger is commercially available from UPO, LLC, of Des Plaines, Il., under the trade name of Molecular Sieve Type 3A.

The Antifoaming Agent is a silicone liquid and is commercially available from Dow Corning of Midland, Mi., under the trade name of Antifoam-A.

The Isocyanate 1 is commercially available from BASF Corporation of Wyandotte, Mi., under the trade name of Lupranate® MM-103 and is a liquid carbodiimide modified 4,4'-diphenylmethane diisocyanate that includes a % NCO content of 29.5%, a nominal functionality of 2.1, and a viscosity of 40 cps at 25° C.

The Isocyanate 2 is commercially available from BASF Corporation of Wyandotte, Mi., under the trade name of Lupranate® MP-102 and is a liquid modified pure diphenylmethane diisocyanate that includes a % NCO content of 23%, a nominal functionality of 2, a viscosity of 700 cps at 25° C., and a number average molecular weight of 183 g/mol.

The Isocyanate 3 is commercially available from BASF Corporation of Wyandotte, Mi., under the trade name of Elastoflex® R23000T and is a polymeric diphenylmethane diisocyanate that includes a % NCO content of 31.4%, a nominal functionality of 2.7, and a viscosity of 200 cps at 25° C.

The Isocyanate 4 is commercially available from BASF Corporation of Wyandotte, Mi., under the trade name of Lupranate® M, is a solid at room temperature, and is essentially pure 4,4'-diphenylmethane diisocyanate.

The Isocyanate 5 is commercially available from BASF Corporation of Wyandotte, Mi., under the trade name of Lupranate® MI and is pure diphenylmethane diisocyanate including 2,4'-diphenylmethane diisocyanate that includes a % NCO content of 33.5%, a nominal functionality of 2 and a viscosity of 15 cps at 25° C.

The Isocyanate Index, as first introduced above, is defined as a ratio of the number of isocyanate (NCO) groups in the Isocyanates to the number of hydroxyl (OH) groups in the Resin Composition including the Polyols 1 through 3 and the Chain Extender.

The % NCO is the percent by weight of the NCO groups of the Isocyanates. Determination of the % NCO content on percent by weight is accomplished by a standard chemical titration analysis known to those skilled in the art.

After curing each of the Mixtures 1 through 34 and the Comparative Mixture 1 to form the Molded Articles 1 through 34 and the Comparative Molded Article 1, respectively, 4 by 4 inch samples that are 0.05 inches thick, are prepared from each of the Molded Articles 1 through 34 and the Comparative Molded Article 1. Each sample is cut with a knife, i.e., scored, completely through to form a score line which separates each sample into a first portion and a second portion. Immediately after separation, the first and second portions are rejoined and held in position with tape. To determine tensile heal strength, the tape is removed after 24 hours and each sample is tested to determine the tensile heal strength along the score line. To additionally determine heat aged tensile strength, the samples of Molded Articles 21 through 32, are then heated for 24 hours at 124° C. between metal plates to prevent warping and subsequently cooled. After cooling, the tape is removed and each sample is tested to determine the heat aged tensile heal strength along the score line. Both the tensile heal strength and the heat aged tensile heal strength recorded in Table 1 are measured as the forces required to re-separate the first and second portions of each of the samples divided by the thickness of the samples. The tensile heal strengths corresponding to each of the Molded Articles 1 through 34 and the Comparative Molded Article 1 are set forth in Table 2 below.

Additionally, samples of the Molded Articles 10 through 20 and Molded Articles 33 and 34 are evaluated for Graves Tear Strength, as determined by ASTM D624 Die C, and Tensile Strength and Elongation, as determined by ASTM D412 Die A. Further, Molded Articles 21 through 32 are also evaluated for Graves Tear Strength, Tensile Strength, Elongation, and Shore A Durometer Hardness, as determined by ASTM D2240 Die A. The Graves Tear Strengths, Tensile Strengths, Elongations, and Shore A Durometer Hardnesses are set forth in Table 2 below.

TABLE 2

|  | Molded Article 1 | Molded Article 2 | Molded Article 3 | Molded Article 4 | Molded Article 5 |
|---|---|---|---|---|---|
| Tensile Heal Strength (ppi) | 177 | 187 | 159 | 125 | 171 |
| Heat Aged Tensile Heal Strength (ppi) | N/A | N/A | N/A | N/A | N/A |
| Graves Tear Strength (ppi) | N/A | N/A | N/A | N/A | N/A |
| Tensile Strength (psi) | N/A | N/A | N/A | N/A | N/A |
| Elongation (%) | N/A | N/A | N/A | N/A | N/A |
| Shore A Durometer Hardness | N/A | N/A | N/A | N/A | N/A |

|  | Molded Article 6 | Molded Article 7 | Molded Article 8 | Molded Article 9 | Molded Article 10 |
|---|---|---|---|---|---|
| Tensile Heal Strength (ppi) | 152 | 33 | 88 | 116 | 8 |
| Heat Aged Tensile Heal Strength (ppi) | N/A | N/A | N/A | N/A | N/A |
| Graves Tear Strength (ppi) | N/A | N/A | N/A | N/A | 52.5 |
| Tensile Strength (psi) | N/A | N/A | N/A | N/A | 724.4 |
| Elongation (%) | N/A | N/A | N/A | N/A | 49.2 |
| Shore A Durometer Hardness | N/A | N/A | N/A | N/A | N/A |

TABLE 2-continued

|  | Molded Article 11 | Molded Article 12 | Molded Article 13 | Molded Article 14 | Molded Article 15 |
|---|---|---|---|---|---|
| Tensile Heal Strength (ppi) | 150.7 | 191 | 102.9 | 54.7 | 87.9 |
| Heat Aged Tensile Heal Strength (ppi) | N/A | N/A | N/A | N/A | N/A |
| Graves Tear Strength (ppi) | 78.4 | 222.3 | 91.9 | 62.3 | 105 |
| Tensile Strength (psi) | 704.4 | 1387.6 | 886.6 | 582.2 | 870.2 |
| Elongation (%) | 123.9 | 164.5 | 100.5 | 80.2 | 97.8 |
| Shore A Durometer Hardness | N/A | N/A | N/A | N/A | N/A |

|  | Molded Article 16 | Molded Article 17 | Molded Article 18 | Molded Article 19 | Molded Article 20 |
|---|---|---|---|---|---|
| Tensile Heal Strength (ppi) | 43.7 | 0 | 11.4 | 68.1 | 10.8 |
| Heat Aged Tensile Heal Strength (ppi) | N/A | N/A | N/A | N/A | N/A |
| Graves Tear Strength (ppi) | 74 | 63.4 | 221.6 | 147.8 | 131 |
| Tensile Strength (psi) | 800.2 | 695.2 | 1498.9 | 1041.1 | 1134.2 |
| Elongation (%) | 66.5 | 44.3 | 177.9 | 76.7 | 90.4 |
| Shore A Durometer Hardness | N/A | N/A | N/A | N/A | N/A |

|  | Molded Article 21 | Molded Article 22 | Molded Article 23 | Molded Article 24 | Molded Article 25 |
|---|---|---|---|---|---|
| Tensile Heal Strength (ppi) | 25 | 40 | 122 | 15 | 26 |
| Heat Aged Tensile Heal Strength (ppi) | 21 | 34 | 130 | 28 | 54 |
| Graves Tear Strength (ppi) | 112 | 42 | 115 | 66 | 43 |
| Tensile Strength (psi) | 1434 | 581 | 1043 | 846 | 587 |
| Elongation (%) | 143 | 61 | 103 | 78 | 69 |
| Shore A Durometer Hardness | 82 | 71 | 76 | 77 | 68 |

|  | Molded Article 26 | Molded Article 27 | Molded Article 28 | Molded Article 29 | Molded Article 30 |
|---|---|---|---|---|---|
| Tensile Heal Strength (ppi) | 88 | 78 | 47 | 3 | 80 |
| Heat Aged Tensile Heal Strength (ppi) | 88 | 104 | 91 | 17 | 64 |
| Graves Tear Strength (ppi) | 94 | 70 | 60 | 38 | 84 |
| Tensile Strength (psi) | 1146 | 770 | 855 | 526 | 1094 |

TABLE 2-continued

| | | | | | |
|---|---|---|---|---|---|
| Elongation (%) | 103 | 86 | 89 | 57 | 106 |
| Shore A Durometer Hardness | 79 | 73 | 75 | 69 | 78 |

| | Molded Article 31 | Molded Article 32 | Comp. Molded Article 1 | Molded Article 33 | Molded Article 34 |
|---|---|---|---|---|---|
| Tensile Heal Strength (ppi) | 28 | 22 | 295 | 415.7 | 322.0 |
| Heat Aged Tensile Heal Strength (ppi) | 19 | 24 | N/A | N/A | N/A |
| Graves Tear Strength (ppi) | 52 | 74 | N/A | 99.4 | 201.8 |
| Tensile Strength (psi) | 697 | 741 | N/A | 758.5 | 1249.3 |
| Elongation (%) | 74 | 66 | N/A | 259.1 | 205.5 |
| Shore A Durometer Hardness | 73 | 77 | N/A | N/A | N/A |

The determinations of the Tensile Heal Strengths, the Heat Aged Tensile Heal Strengths, the Graves Tear Strengths, the Tensile Strengths, and the Elongations indicate that Molded Articles 12 and 18 are most suitable for use as air-bag doors as the Molded Articles 12 and 18 have Graves Tear Strengths of greater than 100 ppi, Tensile Strengths of greater than 900 psi, and Elongations of greater than 150%. Utilizing the Isocyanates 4 and 5 in the methods of the present invention to form the Molded Articles 12 and 18 not only allow the Molded Articles to have excellent Tensile Heal Strength, Heat Aged Tensile Heal Strength, Graves Tear Strength, Tensile Strength, and Elongation, but also indirectly minimize overall production costs as the pressure required to deploy the air-bags is reduced which allows fewer raw materials to be consumed. Also, each of the Molded Articles 1 through 32 are exemplary of the present invention and may be useful for a variety of applications including both automotive and non-automotive applications such as in farming or sporting applications in seats, panels, doors, and the like.

Further, Molded Articles 33 and 34 demonstrate an effectiveness of the method to influence the ability of the Molded Article to self-heal and increase tensile heal strength, if desired. This method may also be utilized in a variety of application including both automotive and non-automotive applications.

Obviously, many modifications and variations of the present invention are possible in light of the above teachings. The invention may be practiced otherwise than as specifically described within the scope of the appended claims.

What is claimed is:

1. A method of forming an article having a periphery and defining a score line within the periphery dividing the article into at least a first portion and a second portion separable from the first portion under application of pressure, said method comprising the steps of:
   a) applying an isocyanate component and a resin composition into a mold cavity, wherein the resin composition comprises a polyol, wherein the polyol comprises an ethylene oxide cap of from 10 to 20 percent by weight based on the total weight of the polyol;
   b) reacting the isocyanate component and the resin composition to form a urethane composition;
   c) curing the urethane composition to form a cured urethane composition, wherein the cured urethane composition is elastomeric;
   d) de-molding the article from the mold cavity; and
   e) scoring the article within the periphery to form the score line having a tensile heal strength of less than 200 pounds per inch along the score line.

2. A method as set forth in claim 1 wherein the tensile heal strength is less than 150 pounds per inch.

3. A method as set forth in claim 1 wherein the isocyanate component is selected from the group of polymeric methylene diphenyl diisocyanate, 4,4'-methylene diphenyl diisocyanate, 2,4'-methylene diphenyl diisocyanate and combinations thereof.

4. A method as set forth in claim 1 wherein the resin composition further comprises an additive that is structurally symmetric.

5. A method as set forth in claim 4 wherein the additive that is structurally symmetric comprises a diol having less than 6 carbon atoms.

6. A method as set forth in claim 1 wherein the step of scoring the article within the periphery is completed prior to de-molding the article.

7. A molded article having a periphery, defining a score line within said periphery dividing said article into at least a first portion and a second portion separable from said first portion under application of pressure, having a tensile heal strength of less than 200 pounds per inch along said score line, and comprising a cured urethane composition which is elastomeric and includes the reaction product of an isocyanate component and a resin composition comprising a polyol, wherein said polyol comprises an ethylene oxide cap of from 10 to 20 percent by weight based on the total weight of said polyol.

8. An article as set forth in claim 7 wherein said tensile heal strength is less than 150 pounds per inch along said score line.

9. An article as set forth in claim 7 wherein said isocyanate component is selected from the group of polymeric methylene diphenyl diisocyanate, 4,4'-methylene diphenyl diisocyanate, 2,4'-methylene diphenyl diisocyanate and combinations thereof.

10. An article as set forth in claim 7 wherein said resin composition further comprises an additive that is structurally symmetric and comprises a diol having less than 6 carbon atoms.

11. An article as set forth in claim 7 having a graves tear strength of greater than 100 pounds per inch as determined by ASTM D624 Die C, a tensile strength of greater than 900 pounds per linear inch as determined by ASTM D412 Die A, and an elongation of greater than 150% as determined by ASTM D412 Die A.

12. An article as set forth in claim 7 including a first layer comprising said cured urethane composition and a second layer disposed on said first layer and comprising a second cured urethane composition different from said cured urethane composition.

13. An article as set forth in claim 12 wherein said second cured urethane composition is foamed.

14. A method of forming an article having a periphery and defining a score line within the periphery dividing the article into at least a first portion and a second portion separable from the first portion under application of pressure, said method comprising the steps of:
   a) determining a theoretical tensile heal strength along the score line;
   b) applying an isocyanate component into a mold cavity in response to the determining of the theoretical tensile heal strength;
   c) applying a resin composition comprising a polyol into the mold cavity, wherein the polyol comprises an ethylene oxide cap of from 10 to 20 percent by weight based on the total weight of the polyol;
d) reacting the isocyanate component and the resin composition to form a urethane composition;
e) curing the urethane composition to form a cured urethane composition, wherein the cured urethane composition is elastomeric;
f) de-molding the article from the mold cavity; and
g) scoring the article within the periphery to form the score line wherein the article has a tensile heal strength of less than 200 pounds per inch along the score line.

15. A method as set forth in claim 14 wherein the step of determining a theoretical tensile heal strength along the score line comprises the step of determining a suitable isocyanate component for use in effecting the theoretical tensile heal strength along the score line.

16. A method as set forth in claim 15 wherein the step of applying an isocyanate component into the mold cavity in response to the determining of the theoretical tensile heal strength comprises the step of applying the suitable isocyanate component into the mold cavity.

17. A method as set forth in claim 14 wherein the isocyanate component is selected from the group of polymeric methylene diphenyl diisocyanate, 4,4'-methylene diphenyl diisocyanate, 2,4'-methylene diphenyl diisocyanate and combinations thereof.

18. A method as set forth in claim 14 wherein the resin composition further comprises an additive that is structurally symmetric and has less than 6 carbon atoms.

19. A molded article having a periphery, defining a score line within said periphery dividing said article into at least a first portion and a second portion separable from said first portion under application of pressure, having a tensile heal strength of less than 200 pounds per inch along said score line, and comprising a cured urethane composition which is elastomeric and includes the reaction product of an isocyanate component and a resin composition comprising a polyol, wherein said molded article includes a first layer comprising said cured urethane composition and a second layer disposed on said first layer and comprising a second cured urethane composition different from said cured urethane composition.

20. An article as set forth in claim 19 wherein said second cured urethane composition is foamed.

* * * * *